United States Patent [19]

Youn

[11] Patent Number: 5,354,365
[45] Date of Patent: Oct. 11, 1994

[54] AIR FILTER ASSEMBLY

[76] Inventor: Kun C. Youn, 647 Shartle Cir., Houston, Tex. 77024

[21] Appl. No.: 50,587

[22] Filed: Apr. 22, 1993

[51] Int. Cl.5 .............................................. B01D 53/04
[52] U.S. Cl. ...................................... 96/135; 96/153; 55/487; 55/515
[58] Field of Search .................... 55/512, 515–519; 96/134, 135, 137, 138, 153, 154, 129, 136, 139–142

[56] References Cited

U.S. PATENT DOCUMENTS

| | | | |
|---|---|---|---|
| 1,585,113 | 5/1926 | Robert | 96/136 |
| 1,802,941 | 4/1931 | Dräger | 55/517 X |
| 1,843,446 | 2/1932 | Dräger | 55/517 X |
| 2,303,332 | 12/1942 | Dauphinee | 55/515 X |
| 2,544,733 | 3/1951 | Shuler | 96/154 |
| 2,682,315 | 6/1954 | Evans | 55/518 |
| 2,764,251 | 9/1956 | Jessop | 96/137 |
| 3,411,273 | 11/1968 | Duncan et al. | 55/518 X |
| 3,430,420 | 3/1969 | Gross | 96/129 |
| 3,727,384 | 4/1973 | Feldman | 55/512 X |
| 4,181,513 | 1/1980 | Fukuda et al. | 55/382 X |
| 4,259,096 | 3/1981 | Nakamura et al. | 96/138 |
| 4,418,662 | 12/1983 | Engler et al. | 55/515 X |
| 4,514,197 | 4/1985 | Armbruster | 55/385.2 X |
| 4,699,681 | 10/1987 | Kasmark, Jr. et al. | 55/518 X |
| 4,749,392 | 6/1988 | Aoki et al. | 55/518 X |
| 4,756,726 | 7/1988 | Peace | 55/515 X |
| 5,129,929 | 7/1992 | Linnersten | 96/134 |

FOREIGN PATENT DOCUMENTS

| | | | |
|---|---|---|---|
| 172595 | 9/1952 | Austria | 55/512 |
| 383236 | 8/1990 | European Pat. Off. | 96/134 |
| 334938 | 8/1936 | Italy | 96/139 |
| 363115 | 9/1938 | Italy | 55/515 |
| 61-101224 | 5/1986 | Japan | 96/134 |
| 3-238011 | 10/1991 | Japan | 96/134 |
| 7213722 | 5/1973 | Netherlands | 55/517 |
| 1305711 | 2/1973 | United Kingdom | 96/134 |
| 2238731 | 6/1991 | United Kingdom | 96/138 |

*Primary Examiner*—Robert Spitzer
*Attorney, Agent, or Firm*—Bill B. Berryhill

[57] ABSTRACT

An improved air filter assembly for removing particulates and undesirable gases from a stream of contaminated air including a first layer of filter fabric formed by parallel elongated semi-cylindrical surfaces joined at common parallel edges and a cooperating second layer of filter fabric contacting the first layer of fabric at its common parallel edges so as to leave elongated parallel semi-cylindrical voids therebetween. The voids are filled with gas sorbing materials.

6 Claims, 3 Drawing Sheets

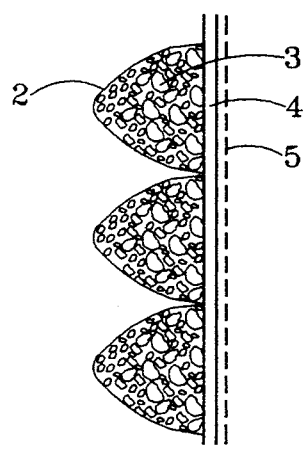
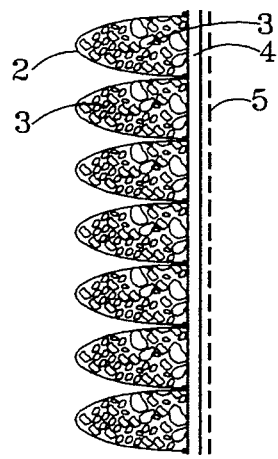
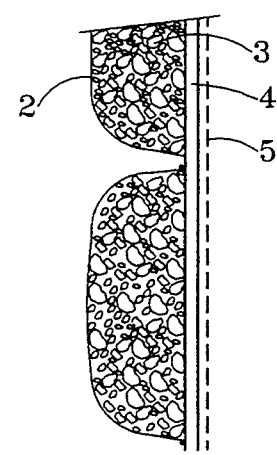
FIG.6A　　　　FIG.6B　　　　FIG.6C
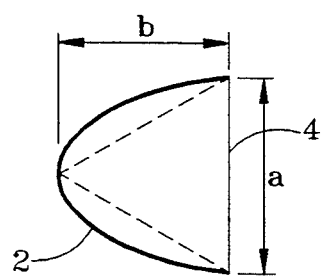
FIG.7
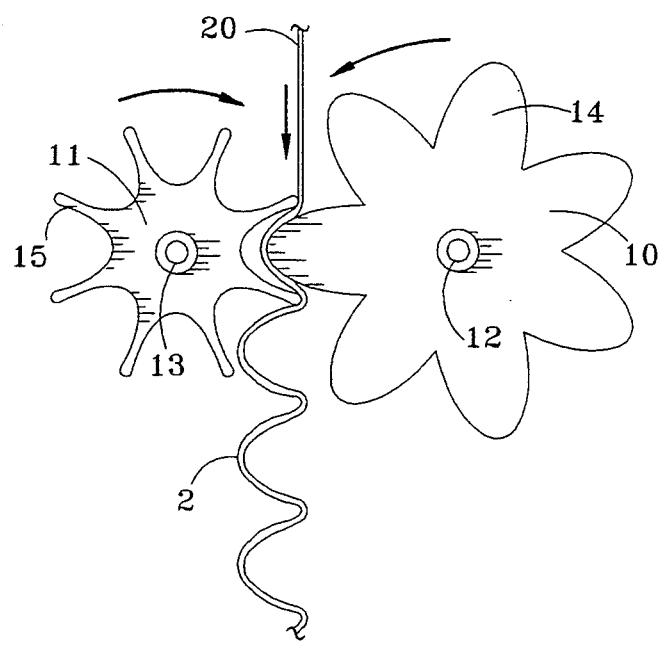
FIG.8

AIR FILTER ASSEMBLY

BACKGROUND OF THE INVENTION

1. Field of the Invention

The present invention pertains to air filters. More specifically, the present invention pertains to filter assemblies suitable for removing particulates and undesirable gases from a stream of contaminated air.

2. Description of the Prior Art

For many years air filters have been used to filter particulates from the air which we breathe. Various types of fabric filters have been used to remove pollen, dust, lint, bacteria, and other airborne pollutants from air circulated through heating and cooling systems. Some of these filters are very effective in removing particulates from the air.

In more recent years, air filters have been designed which remove not only airborne particulates, but undesirable gases as well, e.g. gases associated with cooking, tobacco smoking and other gases emitted from humans, other animals or other processes. Such filters are usually designed as combination filters, combining various fabrics for filtering particulates and other materials for sorbing undesirable gases. Materials for sorbing such undesirable gases may include activated charcoal, silica gel, activated alumina, etc.

Early examples of combination filter assemblies for filtering particulates and sorbing gases are shown in U.S. Pat. Nos. 2,544,733 and 2,764,251. In these early filter assemblies, granular sorbents, such as activated charcoal, silica gel, activated alumina, etc. are sandwiched with one or more layers of filter fabric. The fabric is primarily for filtering particulates and the sorbent is primarily for removing undesirable gases.

Of course, the capacity of particulate filtering is, to a great extent, dependent on the surface area of the filter material through which the contaminated air stream flows. The capacity of gas sorption is to a large extent dependent on the volume of the sorbent material in the filter. Thus, the ideal combination filter assembly should have a relatively large surface area for particulates and a suitable volume of sorbent for gases. In reality, the areas and volumes should be specifically designed for the anticipated amounts of contaminant in the air. However, a combination air filter can be designed which is suitable for most household uses. In designing such a filter, care must be taken to make sure that the filter assembly does not induce a large pressure drop. Most of the domestic and commercial air conditioning and heating units have the maximum allowable pressure drop of 0.5 to 1.0 inches of water gauge. These units would not operate efficiently at pressure drops above the maxima.

In U.S. Pat. No. 4,514,197 a filter is disclosed which is provided with a flat or planar screen of mesh material and a corrugated screen having v-shaped corrugations to define a plurality of parallel elongated troughs or voids of triangular shaped cross-section between the two screens in which porous sorbent materials, such as activated charcoal, are deposited. A flat foam prefilter is provided with this design. Apparently, one of the objects of this filter is the provision of greater filtering area and reduced pressure drop. In a somewhat related patent, U.S. Pat. No. 5,129,929, a filter is provided in which there are two major surfaces, the downstream one of which is flat and an upstream surface of which is formed into a plurality of parallel ridges. The voids between these surfaces are essentially triangular in cross-section and are filled with sorbent for filtering undesirable gases from the air passing therethrough. In one embodiment, the upstream surface is provided with a pleated filter fabric to provide greater surface area for particulate filtering.

While the surface area of particulate filtering and the volume of sorbent for gas filtering of U.S. Pat. Nos. 4,514,197 and 5,129,929 offer improvements over the prior art, these filters may not be easily assembled in low cost mass production. In fact, low cost combination particulate and gas filters of high efficiency and low pressure drop do not appear to be readily available. Consequently, the most prevalent product currently available to consumers takes the form of a fibrous mat (felt) coated with charcoal powder. Of course such a filter is lacking in sorbent capacity and must be used in combination with a separate fabric filter to supplement its poor particulate filtering capability. While custom built carbon filtering beds are available from many vendors, they usually require special containers and adapters for use with domestic and commercial air conditioning and heating systems. Furthermore, they are not affordable for most applications.

Obviously, combination particulate and gas filters which are more efficient and more affordable are desired. Such filters would find ready acceptance in the market place.

SUMMARY OF THE PRESENT INVENTION

A primary object of the present invention is the provision of a combination filter assembly which is highly efficient in removing particulate and gaseous contaminants from air without undue pressure drop and at a reasonable cost. Thus, a major object of the invention is to provide such a filter which is capable of low cost mass production for use in domestic and commercial air conditioning/heating systems.

A further object of the present invention is to provide a combination particulate/gas filter of a configuration which provides relatively large surface area for particulate removal and sufficient volume for gas sorption. A related object of the present invention is to provide a configuration which allows flexibility in design of surface area and gas sorption capacity.

These and other objects of the invention are provided by an improved filter which is constructed with an upstream layer of fabric of high filtering efficiency formed by parallel, elongated semi-cylindrical surfaces and a cooperating downstream flat layer of filter fabric leaving parallel semi-cylindrical voids therebetween. The semi-cylindrical void spaces are filled with gas sorbing materials such as activated charcoal, activated alumina, silica gel, etc.

The semi-cylindrical configuration provides greater surface area for particulate filtering while allowing relatively large volumes of sorbent entrapment. This configuration also promotes more even air flow with less pressure drop than prior art configurations. In addition, it allows independent variation of filtering surface area and sorbent volume providing flexibility of design for various conditions of air contamination.

In a preferred embodiment of the invention, the flat layer of fabric is treated with an adhesive for adhering to the upstream layer at points of contact. In addition, the sorbent granules entrapped in the semi-cylindrical voids which contact the adhesive surface are immobilized, preventing loss, attrition and stratification thereof.

The improved air filter assembly of the present invention is highly efficient in removal of particulate and gaseous contaminants. Furthermore, it may be mass produced for low cost affordability. Many other objects and advantages of the invention will be apparent from reading the description which follows in conjunction with the accompanying drawings.

BRIEF DESCRIPTION OF THE DRAWINGS

FIGS. 6A, 6B and 6C are cross-sectional views of air filters, according to the present invention, but illustrating other embodiments or configurations thereof;

FIG. 7 is a drawing of a semi-ellipse and a triangle used to compare areas and volumes of the air filter of the present invention with prior art filters; and FIG. 8 is a schematic representation of a method of forming one component of the filter assembly of the present invention, according to a preferred embodiment thereof.

DESCRIPTION OF PREFERRED EMBODIMENTS OF THE INVENTION

Figure 1:
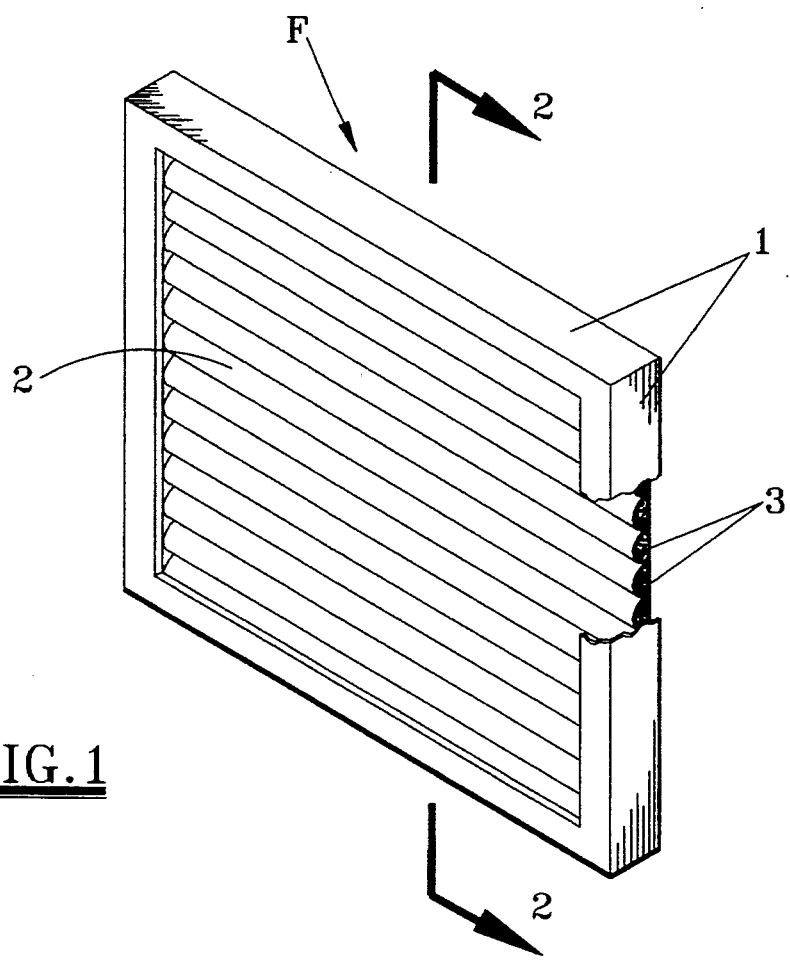
FIG. 1 is a perspective view of an air filter, a portion of the frame of which has been removed for better understanding, according to a preferred embodiment of the invention.
Figure 2:
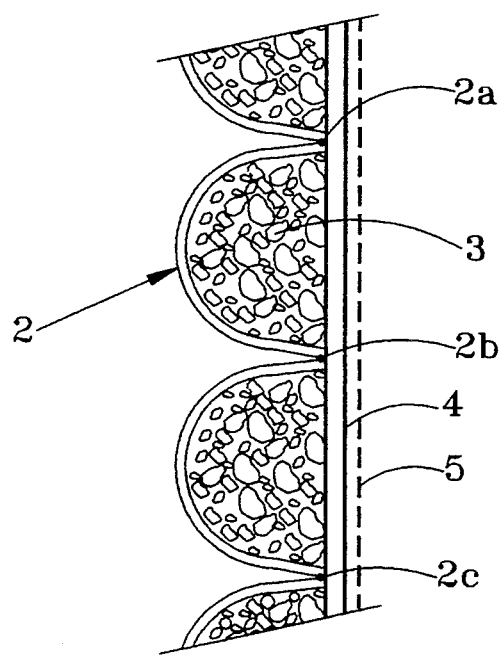
FIG. 2 is a partial cross-sectional view of the air filter of FIG. 1, according to a preferred embodiment thereof.
Figure 3:
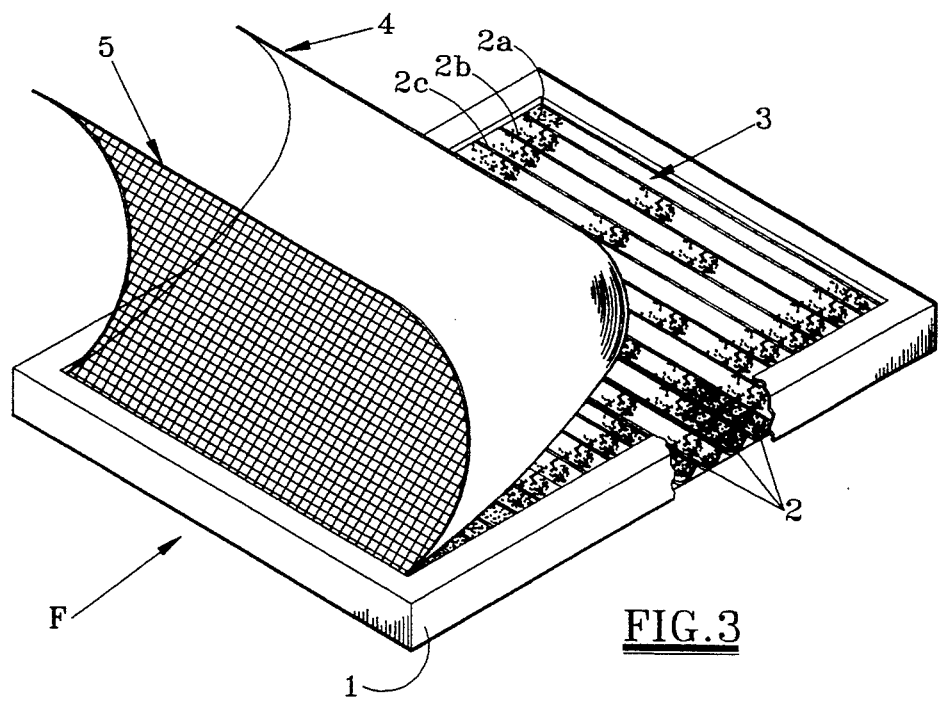
FIG. 3 is a perspective view of the air filter of FIGS. 1 and 2 from the downstream side thereof and illustrating construction features thereof.

Referring first to FIGS. 1, 2 and 3, there is shown an improved air filter assembly F for removing particulates and undesirable gases from a stream of contaminated air, according to a preferred embodiment of the invention. This filter assembly F would normally be placed in the return air register of a heating/cooling air conditioning system. Such a filter would be especially suitable for replacement filters for most home and commercial air conditioning and heating systems. It could also be used as a replacement filter for self-contained room air purification units.

The design illustrated in FIGS. 1-3 has a frame 1 made of paper, plastic or metal to provide support for the other elements of the filter. It also serves to define the outer perimeter of the filter for the particular size air return with which the filter F is to be used. There are, of course, a number of different size air returns for which standard sizes would be generally available.

The filter assembly F includes a first or upstream layer of high efficiency filter fabric 2 which is formed of parallel elongated semi-cylindrical surfaces joined at common parallel edges 2a, 2b, 2c, etc. Although not essential, the high efficiency filter could accompany a layer of wire mesh backing for structural rigidity. In geometry, a surface generated by a line which moves so that it is always parallel to a fixed line and always intersects a fixed curve is called a "cylindrical surface" or "cylinder". It is in this sense that the term "cylindrical" or "semi-cylindrical" is used herein. In other words, the cross-section of one of these elongated cylindrical surfaces may define a semi-circle, semi-ellipse or a parabola. As illustrated in FIG. 2, the cross-section is a semi-ellipse.

A second flat or downstream layer of filter fabric 4 contacts the first layer of filter fabric 2 at the common parallel edges 2a, 2b, 2c, etc. leaving parallel semi-cylindrical voids therebetween. These voids are filled with gas sorbing materials 3 (sorbents) such as activated charcoal, activated alumina, silica gel, etc. The voids are filled with sorbent prior to attachment of the second layer of filter fabric 4. This construction may be best understood by reference to FIG. 3 in which the filter F is shown with the upstream side down and the flat layer of filter fabric 4 pulled back to allow access to the semi-cylindrical voids for placing the sorbent 3 therein.

One side of the second or flat layer of filter fabric 4 (the upstream side) is preferably treated with an adhesive so that when in place, as shown in FIG. 2, it is adhered or cemented to the first layer of fabric 2 along the parallel edges 2a, 2b, 2c, etc. In addition to adhering to the first layer of fabric 2, the adhesive adheres to granules of activated charcoal 3 (or other sorbent) in contact with the second layer of filter fabric 4. This immobilizes the adjacent sorbent granules, generally trapping and immobilizing the rest of the granules to prevent loss, attrition and stratification. After the sorbent and the first and second layers of filter fabric are assembled, a back-up or support element may be provided to support the filter elements against the flow of air. In the exemplary embodiment, this back-up or support element is provided by a perforated metal screen 5.

When assembled and in place, such as illustrated in FIGS. 1 and 2, the filter assembly F filters particulates and undesirable gases from a stream of contaminated air flowing therethrough. The first layer of filter fabric 2 is preferably of a fabric designed for high efficiency filtering of particulates. The second layer of filter fabric 4 is relatively more porous than the first. Of course, the sorbent materials 3 filter or remove undesirable gases from the stream of air.

Figures 4, 5:
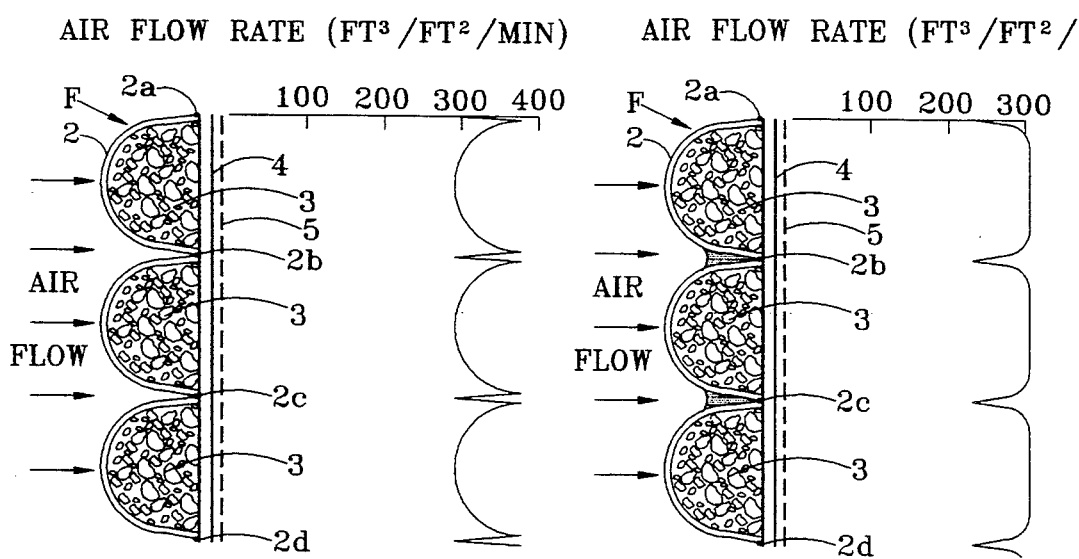
FIG. 4 represents the cross-section of a new filter, according to a preferred embodiment of the invention, illustrating air flow therethrough.
FIG. 5 is a cross-sectional view of a used filter, according to a preferred embodiment of the invention, illustrating air flow therethrough.

The unique filter of the present invention provides efficient particulate and gas filtration with more even flow and less pressure drop than most other designs of the prior art which attempt to filter the same materials. FIGS. 4 and 5 illustrate air flow rate for a new filter (FIG. 4) and for the same filter after it has been used for a period of time (FIG. 5). The curve to the right of the filters F in FIGS. 4 and 5 represent air flow rate in cubic feet, per square foot, per minute. As can be seen, flow rate with a new filter F (FIG. 4) is greatest on either side of the contact points 2a, 2b, 2c, 2d, etc. This is naturally understood since the pressure drop would be the least in these areas. After a period of time dust and other particulates begin to accumulate on the first layer of filter fabric 2 and the highest accumulation of particulates occurs in the troughs between adjacent semi-cylindrical surfaces directly to the left of the contact points 2a, 2b, 2c, 2d, etc. As this occurs, the pressure drop at these points increases and air flow is more evenly distributed across the remainder of the filter. See FIG. 5.

The semi-cylindrical surface design of the filter F of the present invention can be provided in any number of configurations and can be changed to adapt the surface area of the first layer of filter fabric 2 for different areas or the volume of the gas sorbing materials 3 for different volumes. Just a few examples of such variations are shown in FIGS. 6A, 6B and 6C. Thus, the filter assembly F can be specifically designed for air of different components. For example, if the air were more heavily laden with particulates the filter might be designed with greater surface areas as shown in FIG. 6B. Or if the air were more heavily laden with undesirable gas, it might be designed with greater sorbent volume as shown in configuration of FIG. 6C. Filter 6B has approximately four times the filtering surface area compared to FIG. 6C.

The most notable feature of the filter of the present invention is its semi-cylindrical first filter layer design and the elongated semi-cylindrical volumes of sorbent contained therein. This particular configuration provides greater surface area and greater volume than designs of the prior art. For example, comparing the design of the present invention (represented by the semi-elliptic layer 2 of FIG. 7) with the triangular trough design of U.S. Pat. No. 4,514,197 (represented by the dashed lines in FIG. 7), the area (A) and volumes (V) may be compared by formulas in which "a" represents the base of triangular troughs or the base of the semi-elliptical configuration of the present invention and where "b" represents the height of the triangular troughs or the height of the semi-ellipse of the present invention, i.e. the distance from the second or downstream flat filter fabric 4 to the most upstream point of the first layer filter fabric 2. "N" will represent the number of triangular troughs in the prior art design or semi-cylindrical surfaces in the present invention and "C" will represent the length of the triangular troughs or the semi-cylindrical surfaces in the present invention. For ease of calculation, it will be assumed that a=b=1. For the triangular trough prior art design:

$$A = 2 \sqrt{(a/2)^2 + b^2} \times N \times C,$$

or, $A = 2(1.12)NC = 2.24NC$ when $a = b = 1$

For the semi-cylindrical trough design of the present invention:

$$A = \pi \sqrt{\frac{(a/2)^2 + b^2}{2}} \times N \times C,$$

or, $A = \pi(0.79)NC = 2.48NC$ when $a = b = 1$

Thus for the same base and height dimensions (1) and the same number of troughs or semi-cylindrical surfaces and the same length the semi-cylindrical design of the present invention provides approximately 11% more surface area.

Comparing volume, the volume for the triangular trough design is:

$$V = \frac{ab}{2} \times N \times C,$$

or, $V = 0.5NC$ when $a = b = 1$

Volume for the semi-cylindrical design of the present invention is:

$$V = \frac{\pi 1/2 ab}{2} \times N \times C,$$

-continued
or, $V = 0.79NC$ when $a = b = 1$

This calculation indicates that the volume for the semi-cylindrical design of the present invention is approximately 57% greater than the triangular trough design.

As previously mentioned, many of the filter designs which attempt to provide greater surface area and/or volume for sorbents are relatively complex to manufacture, particularly if the first layer of fabric is of some unusual construction. Even though the first layer of fabric 2 of the present invention is unique, it can be formed rather easily. FIG. 8 illustrates a method of forming the semi-cylindrical surfaced first layer 2 of the present invention. In this example, a pair of elongated rollers 10 and 11 are mounted on parallel axes 12 and 13. One of the rollers 10 is provided with a plurality of lobes 14 which generally conform to the cross-sectional area of the semi-cylindrical voids in which the gas sorbing materials of the filter of the present invention are to be eventually deposited. The other roller 11 has a plurality of spikes or points 15 which generally conform to the outer spaces or troughs between the adjoining semi-cylindrical surfaces of fabric layer 2. A flat sheet of fabric 20 is fed between the two rollers 10 and 11 while they rotate. A predetermined amount of tension is maintained on the flat sheet of fabric. As the fabric feeds between the lobes 14 of the roller 10 and the spikes 15 of the roller 11, it is formed or deformed so that it exits from the rollers in the semi-cylindrical layer 2. Tension on the fabric 20 as it is fed between the rollers will to some degree determine the amount of fabric stretching. The fabric formed under a high tension will shrink more after it is formed and will be suitable for a denser pleating configuration as shown in FIG. 6B. A lower tension, on the other hand, will result in more fabric between the edges (2a, 2b and 2c) and will be suitable for configurations such as FIG. 6A. For much closer or farther apart configurations, different rollers would have to be used.

Thus, the filter assembly of the present invention is unique in construction. It offers great efficiency in particulate and undesirable gas filtration from a stream of contaminated air. It provides greater surface area and sorbent volume than prior art designs. Furthermore, the unique filter of the present invention can be made by mass production methods so that it would be affordable to most home or commercial installations.

A preferred embodiment of the invention and several variations thereof have been described herein. However, many variations of the present invention may be made without departing from the spirit thereof. Accordingly, it is intended that the scope of the invention be limited only by the claims which follow.

What is claimed is:
1. An improved air filter assembly for removing particulates and undesirable gases from a stream of contaminated air, said filter assembly comprising:
   a first layer of air permeable filter fabric formed by parallel elongated semi-cylindrical surfaces joined at common parallel edges;
   a second flat layer of air permeable filter fabric contacting said first layer of filter fabric and continuously cemented thereto along said common parallel edges leaving isolated elongated parallel semi-cylindrical voids therebetween; and gas sorbing material filling said semi-cylindrical voids.

2. The improved air filter assembly of claim 1 including a flat perforated support screen adjacent to said second layer of filter fabric for supporting said assembly against the flow of said stream of air.

3. The improved air filter assembly of claim 1 in which said first layer of filter fabric is of high particulate filtering efficiency and said second layer of filter fabric is relatively more porous than said first layer of filter fabric.

4. The improved air filter of claim 1 in which said gas sorbing material is granules of activated charcoal.

5. The improved air filter of claim 4 in which the upstream surface of said second layer of filter material is treated with an adhesive for said cementing of said first and second layer of filter material at said common parallel edges and so that granules of activated charcoal in contact therewith are adhered to said second layer of filter material immobilizing other of said granules of activated charcoal to prevent loss, attrition and stratification thereof.

6. The improved air filter of claim 1 in which the cross-sectional areas of the semi-cylindrical voids defined between said first and second layer of filter fabric are semi-elliptical in cross-section.

* * * * *